(12) United States Patent
Sakaguchi et al.

(10) Patent No.: US 10,219,423 B2
(45) Date of Patent: Mar. 5, 2019

(54) TRAVEL ROUTE GENERATION DEVICE AND TRAVEL ROUTE GENERATION METHOD

(71) Applicant: Kubota Corporation, Osaka-shi (JP)

(72) Inventors: Kazuo Sakaguchi, Amagasaki (JP);
Izuru Shimamoto, Amagasaki (JP);
Kenji Tamatani, Amagasaki (JP);
Megumi Suzukawa, Amagasaki (JP);
Atsushi Shinkai, Sakai (JP)

(73) Assignee: KUBOTA CORPORATION, Osaka-Shi (JP)

( * ) Notice: Subject to any disclaimer, the term of this patent is extended or adjusted under 35 U.S.C. 154(b) by 0 days.

(21) Appl. No.: 15/629,754

(22) Filed: Jun. 22, 2017

(65) Prior Publication Data

US 2018/0206390 A1 Jul. 26, 2018

(30) Foreign Application Priority Data

Jan. 20, 2017 (JP) .................................. 2017-008355
Jan. 20, 2017 (JP) .................................. 2017-008358

(51) Int. Cl.

| G01C 22/00 | (2006.01) |
|---|---|
| G05D 1/00 | (2006.01) |
| A01B 69/04 | (2006.01) |
| G05D 1/02 | (2006.01) |
| G01C 21/36 | (2006.01) |
| G06F 7/00 | (2006.01) |
| G06F 17/00 | (2006.01) |
| G06F 19/00 | (2018.01) |
| G01C 21/34 | (2006.01) |

(Continued)

(52) U.S. Cl.
CPC ........ *A01B 69/008* (2013.01); *G01C 21/3644* (2013.01); *G05D 1/0219* (2013.01); *G05D 1/0278* (2013.01)

(58) Field of Classification Search
CPC .... A01B 69/008; A01B 79/00; G05D 1/0219; G05D 1/0278; G05D 1/0212; G01C 21/3644
USPC .............................. 701/25, 58, 533; 345/173
See application file for complete search history.

(56) References Cited

U.S. PATENT DOCUMENTS 7,043,342 B1 * 5/2006 Dewees ............. B62D 15/0295
116/28 R
2004/0201578 A1 * 10/2004 Sadahiro ............... G06F 1/1607
345/173

(Continued)

FOREIGN PATENT DOCUMENTS

JP 10-243708 9/1998

*Primary Examiner* — Mahmoud S Ismail
(74) *Attorney, Agent, or Firm* — Mori & Ward, LLP

(57) ABSTRACT

A travel route generation device includes a memory, an input interface, and circuitry. The memory is to store field data including shape information on a shape of a field in which a work vehicle is to work. A field operation parameter is input via the input interface. The field operation parameter includes headland information on a headland in the field. The circuitry is configured to generate, based on the field data and the field operation parameter, a travel route along which the work vehicle is to travel in the field. The circuitry is configured to estimate a work status of the work vehicle in the field. The circuitry is configured to display the shape of the field, the travel route, and the work status in a display.

9 Claims, 3 Drawing Sheets

(51) Int. Cl.
 *G08G 1/123* (2006.01)
 *G06F 3/041* (2006.01)

(56) References Cited

U.S. PATENT DOCUMENTS

| | | | |
|---|---|---|---|
| 2013/0226454 A1* | 8/2013 | Hisano | G06N 5/02 701/533 |
| 2015/0345621 A1* | 12/2015 | Sujan | F16H 61/0213 701/58 |
| 2017/0090479 A1* | 3/2017 | Wilcox | A01B 79/00 |

* cited by examiner

TRAVEL ROUTE GENERATION DEVICE AND TRAVEL ROUTE GENERATION METHOD

CROSS-REFERENCE TO RELATED APPLICATIONS

The present application claims priority under 35 U. S. C. § 119 to Japanese Patent Application No. 2017-008355, filed Jan. 20, 2017 and to Japanese Patent Application No. 2017-008358, filed Jan. 20, 2017. The contents of these applications are incorporated herein by reference in their entirety.

BACKGROUND OF THE INVENTION

Field of the Invention

The present invention relates to a travel route generation device and a travel route generation method.

Discussion of the Background

For example, Unexamined Japanese Patent Publication No. H10-243708 describes a conventional travel route generation device. The travel route generation device described in Unexamined Japanese Patent Publication No. H10-243708 generates a travel route along which a work vehicle travels in a field.

SUMMARY OF THE INVENTION

According to one aspect of the present invention, a travel route generation device includes a memory, an input interface, and circuitry. The memory is to store field data including shape information on a shape of a field in which a work vehicle is to work. A field operation parameter is input via the input interface. The field operation parameter includes headland information on a headland in the field. The circuitry is configured to generate, based on the field data and the field operation parameter, a travel route along which the work vehicle is to travel in the field. The circuitry is configured to estimate a work status of the work vehicle in the field. The circuitry is configured to display the shape of the field, the travel route, and the work status in a display.

According to another aspect of the present invention, a travel route generation device includes a memory, an input interface, travel route generation means, work status estimation means, and display means. The memory is to store field data including shape information on a shape of a field in which a work vehicle is to work. A field operation parameter is input via the input interface. The field operation parameter includes headland information on a headland in the field. The travel route generation means are for generating, based on the field data and the field operation parameter, a travel route along which the work vehicle is to travel in the field. The work status estimation means are for estimating a work status of the work vehicle in the field. The display means are for displaying the shape of the field, the travel route, and the work status in a display.

According to further aspect of the present invention, a travel route generation method includes providing field data in a memory. The field data includes shape information on a shape of a field in which a work vehicle is to work. A field operation parameter including headland information on a headland in the field is inputted. A travel route along which the work vehicle is to travel in the field is generated based on the field data and the field operation parameter. A work status of the work vehicle in the field is estimated. The shape of the field, the travel route, and the work status are displayed in a display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
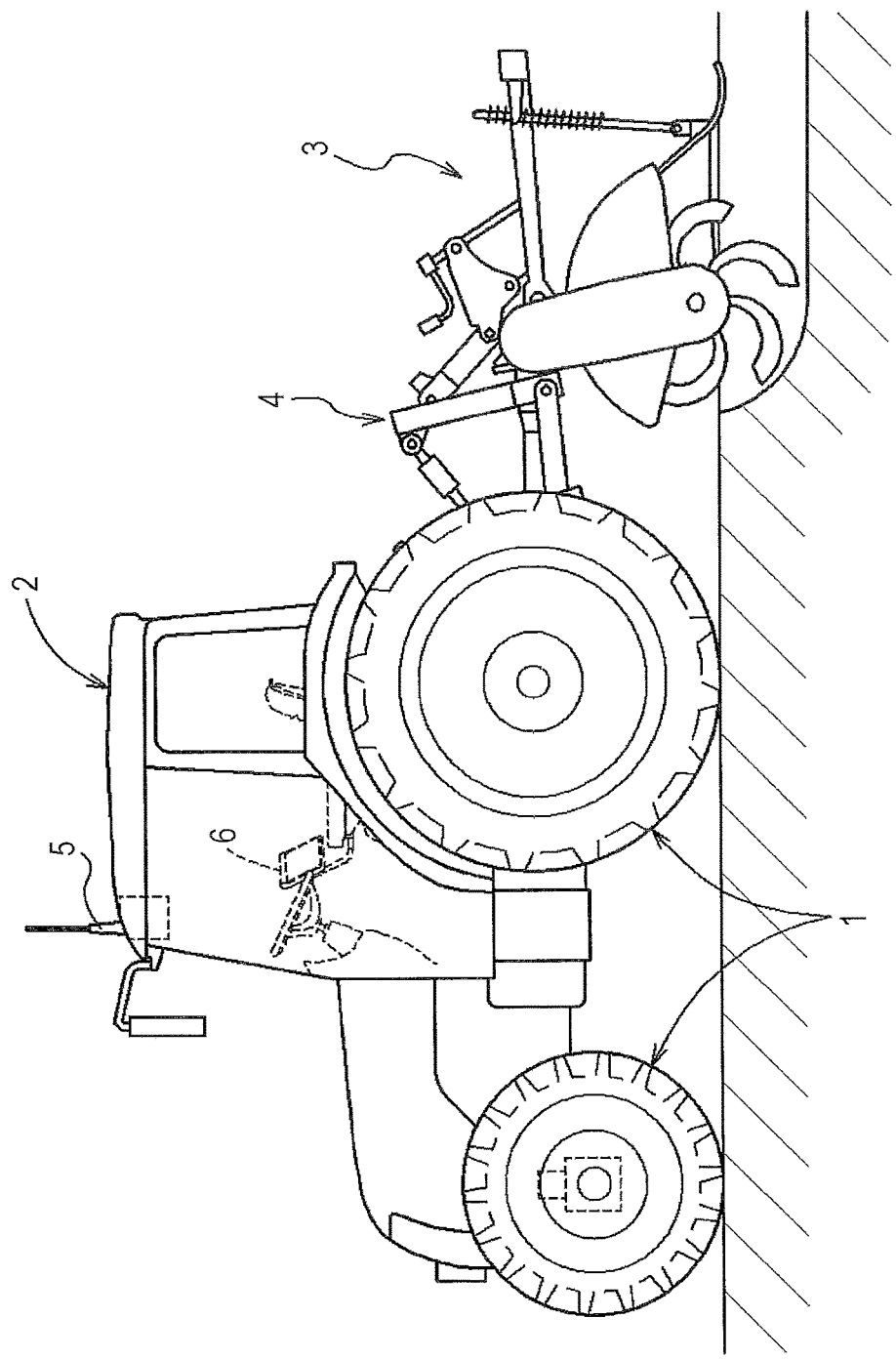
FIG. 1 is a side view illustrating one example of a configuration of a tractor.

The embodiments will now be described with reference to the accompanying drawings, wherein like reference numerals designate corresponding or identical elements throughout the various drawings.

An exemplary embodiment that is one example of the present invention will be described below with reference to the drawings.

About Configuration of Work Vehicle

As illustrated in FIG. 1, a tractor (one example of "work vehicle") includes components such as a four-wheel travel device 1 that causes a machine body to travel, a driving unit 2 that allows an operator to get in and perform a driving operation, a work device 3 that can perform ground work on a field, a lifting and coupling mechanism 4 that couples the work device 3 to this machine of the machine body liftably and shakably around a longitudinal shaft center, a mobile station 5 that can receive GNSS position information, and a travel route generation device 6 that can perform various operation inputs and information presentations.

About Travel Route Generation Device

As illustrated in FIG. 1, the travel route generation device 6 is provided in the driving unit 2. That is, the travel route generation device 6 is a vehicle-mounted device fixed to the driving unit 2 of the tractor.

Figure 2:
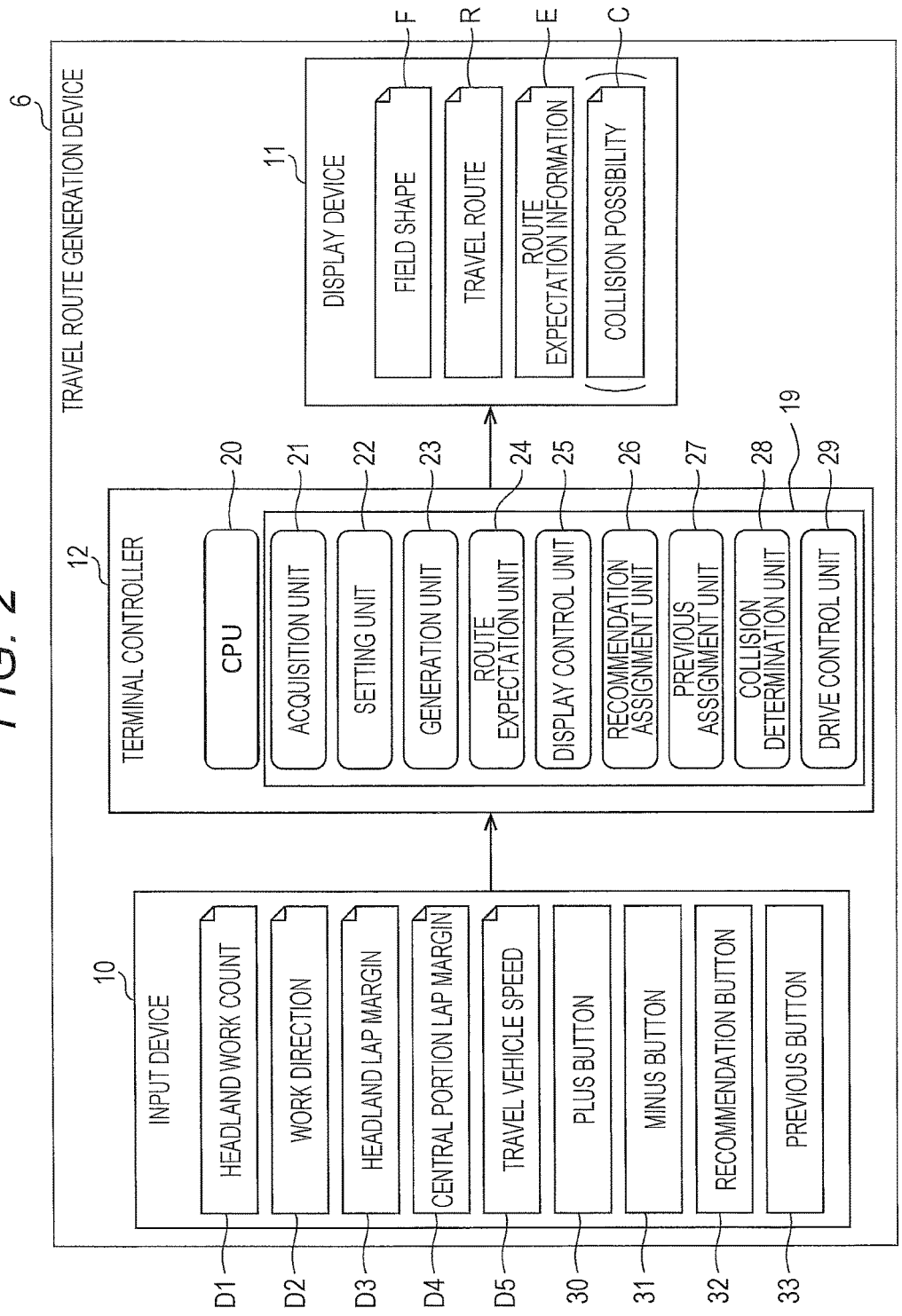
FIG. 2 is a block diagram schematically illustrating a configuration of a travel route generation device.
Figure 3:
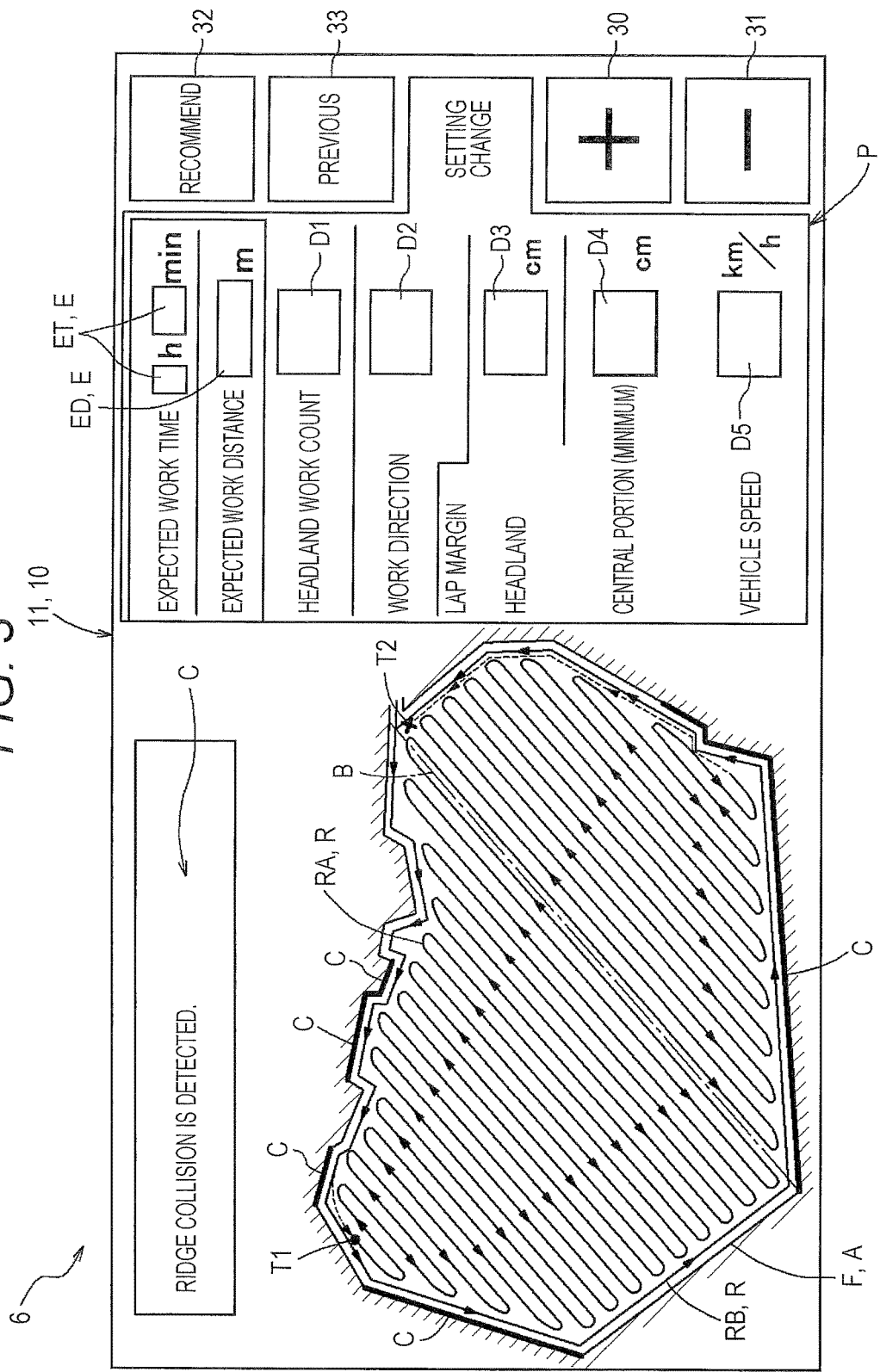
FIG. 3 is a diagram illustrating a travel route and the like generated by the travel route generation device.

As illustrated in FIGS. 2 and 3, the travel route generation device 6 includes an input device 10 that can input information by an operation such as a touch operation on a screen, a display device 11 that can display information, and a terminal controller 12 that performs various types of control. That is, the travel route generation device 6 is a touch-panel operation terminal.

As illustrated in FIG. 2, the terminal controller 12 includes a memory 19 that stores various pieces of data, and a central processing unit (CPU) 20 (circuitry 20). The terminal controller 12 further includes an acquisition unit 21 that acquires field data including a field shape F, a setting unit 22 that can set travel work parameters P (field operation parameters P) including headland information on the basis of a manual operation, a generation unit 23 that generates a travel route R along which the tractor travels on the basis of the field data and the travel work parameters P, and a route expectation unit 24 that derives route expectation information E (a work status E) about the generated travel route R.

In addition, as illustrated in FIG. 2, the terminal controller 12 includes a display control unit 25 that causes the display device 11 capable of displaying information to display the acquired field shape F, the generated travel route R, and the derived route expectation information E, a recommendation assignment unit 26 that can collectively assign, on the basis of a manual operation, recommended parameters with which the travel route R generated as the travel work parameters P has the shortest length, a previous assignment unit 27 that can collectively assign, on the basis of a manual operation, previous parameters used previously as the travel work parameters P, a collision determination unit 28 that determines whether or not there is collision possibility C of colliding with part of the field when the tractor actually travels along the travel route R, and a drive control unit 29 that outputs a control signal to a machine body controller of the tractor. Programs of the acquisition unit 21, the setting unit 22, the generation unit 23, the route expectation unit 24, the display control unit 25, the recommendation assignment unit 26, the previous assignment unit 27, the collision determination unit 28, and the drive control unit 29 are stored in the memory 19 and executed by the CPU 20 to perform functions of the acquisition unit 21, the setting unit 22, the generation unit 23, the route expectation unit 24, the display control unit 25, the recommendation assignment unit 26, the previous assignment unit 27, the collision determination unit 28, and the drive control unit 29, respectively.

The memory 19 illustrated in FIG. 2 stores field data in which a field size, the field shape F, GNSS position information at each point, and other information are associated with each other on a field-by-field basis. The acquisition unit 21 illustrated in FIG. 2 acquires the field data from the memory 19. The setting unit 22 illustrated in FIG. 2 is configured to set the travel work parameters P on the basis of operational input of the input device 10 or the like. The setting unit 22 can set a travel vehicle speed D5 as part of the travel work parameters P.

The generation unit 23 illustrated in FIG. 2 is configured to generate the travel route R along which the tractor travels on the basis of the field data and the travel work parameters P. As illustrated in FIGS. 2 and 3, the route expectation unit 24 is configured to derive an expected work distance ED (a total travel distance ED) about the travel route R generated by the generation unit 23 as the route expectation information E. In addition, the route expectation unit 24 is configured to derive an expected work time ET (a total work time ET) about the travel route R generated as the route expectation information E on the basis of the travel vehicle speed D5.

As illustrated in FIGS. 2 and 3, the display control unit 25 causes the display device 11 to display the derived expected work distance ED. In addition, the display control unit 25 causes the display device 11 to display the derived expected work time ET. When the collision determination unit 28 determines that the collision possibility C is present, the display control unit 25 causes the display device 11 to display the collision possibility C determined by the collision determination unit 28.

As illustrated in FIG. 2, the drive control unit 29 is configured to output a control signal to the machine body controller of the tractor on the basis of the travel route R generated by the generation unit 23 and the travel work parameters P. The machine body controller performs drive and steering control of the travel device 1 and the like on the basis of the control signal that is input from the drive control unit 29.

In the present exemplary embodiment, the recommended parameters assigned by the recommendation assignment unit 26 and the previous parameters assigned by the previous assignment unit 27, which can be collectively assigned as the travel work parameters P, are configured such that the collision possibility C can occur in the generated travel route R.

About Generation of Travel Route

To begin with, information regarding a type of this machine is input on the basis of a manual operation of the input device 10. Accordingly, size information regarding this machine can be obtained (such as a machine body width of this machine, a longitudinal machine body length of this machine, a disposition place of the travel device 1 in this machine).

Next, information regarding a type of the work device 3 is input on the basis of a manual operation. Accordingly, size information regarding the work device 3 can be obtained (such as a work width of the work device 3, a longitudinal length of the work device 3, an attachment position of the work device 3 to this machine).

Next, the acquisition unit 21 acquires the field data about the field to be worked from the memory 19 illustrated in FIG. 2. The field data has been registered in advance.

Next, as illustrated in FIG. 3, the travel route generation device 6 displays a route creation screen. In the route creation screen, as items of the travel work parameters P, a headland work count D1 of performing round work, such as round about plowing, a work direction D2 that is a rotation direction of the tractor, a headland lap margin D3 in headland work, a central portion lap margin D4 in central portion work, and the travel vehicle speed D5 at which the tractor travels can be input. The headland work count D1 and the headland lap margin D3 are headland information. A headland width D6 is determined on the basis of the headland work count D1, the headland lap margin D3, and the work width D7 of the work device 3. For example, the headland width D6 is calculated as follows:

$$D6=D7*D1-D3*(D1-1)$$

The shape of the headland is determined based on the field shape F and the headland width D6.

When numerical values are input into all the items in which the travel work parameters P can be input by operations, as illustrated in FIG. 3, the travel route R is generated on the basis of the travel work parameters P.

As illustrated in FIG. 3, the travel route R to be generated includes a central portion route RA along which reciprocating work travel is performed in the central portion of the field, and a headland route RB along which work travel is performed in the headland surrounding the central portion route RA. Straight line sections of the central portion route RA are parallel to a reference straight line B that is set in advance. The distances between adjacent straight line sections are determined based on the central portion lap margin D4 and the work width of the work device 3. Further, the central portion route RA includes U-turn routes that connect the straight line sections. The U-turn routes are provided in the headland. The headland route RB and the U-turn routes are determined based on the shape of the headland. In addition, the travel route R to be generated includes a work start point T1 where work travel is started, and a work end point T2 where work travel is ended.

As illustrated in FIG. 3, the display device 11 displays the generated travel route R and the route expectation information E associated with the travel route R. For additional description, as the route expectation information E, the expected work distance ED and the expected work time ET about the generated travel route R are displayed. In addition, in association with the generated travel route R, in a case where there is a possibility of collision with part of a ridge of the field or the like when the actual tractor collides with the travel route R, the collision possibility C is displayed. As illustrated in FIG. 3, the collision possibility C is displayed as a line in each straight line section of an edge of the external shape of the field. In addition, as illustrated in FIG. 3, a message is also displayed together as the collision possibility C, such as "ridge collision is detected."

As illustrated in FIG. 3, the input device 10 is provided with screen buttons and entry fields on the route creation screen. As the screen buttons, a plus button 30 that increases a numerical value by a touch operation, a minus button 31 that decreases a numerical value by a touch operation, a recommendation button 32 that collectively assigns the recommended parameters as the travel work parameters P, and a previous button 33 that collectively assigns previous parameters as the travel work parameters P. Each entry field enables input of an individual numerical value of each item of the travel work parameters P on the basis of an operation on the plus button 30 and the minus button 31. Performing a touch operation on the entry field of each travel work parameter P enables change in the numerical value of the individual item. Operations of the plus button 30 and the minus button 31 enable increase and decrease in the numerical value of each item, respectively.

When the numerical value of each item is changed by the operation of the plus button 30 or the minus button 31 illustrated in FIG. 3, the travel route R is generated again and immediately displayed on the basis of the changed travel work parameters P, and in response to this, the route expectation information E (expected work distance ED, expected work time ET) and the collision possibility C are generated again, immediately updated and displayed.

This enables the operator to appropriately evaluate validity of the generated travel route R on the basis of the travel route R, the route expectation information E, and the collision possibility C, which are displayed again every time the travel work parameters P are changed, and to set the travel route R that meets an object.

Thus, it is possible to cause the tractor to travel automatically in the field on the basis of the travel route R generated by the travel route generation device 6 and the GNSS information received by the mobile station 5, and to perform ground work (such as tilling and tilling before transplantation) by the work device 3. The present exemplary embodiment is configured to perform travel control of the tractor by complete automatic travel by which rotation of the tractor is also performed automatically.

In addition, the travel of the tractor is temporarily and automatically stopped immediately before a place where the collision possibility C is present in the travel route R.

Other Embodiments

Other exemplary embodiments obtained by adding changes to the above-described exemplary embodiment will be described below. A combination of the plurality of following other exemplary embodiments is applicable to the above-described exemplary embodiment, provided that no contradictions arise. Note that the scope of the present invention is not limited to details indicated in each exemplary embodiment.

(1) The above-described exemplary embodiment has described an example in which the travel route R for one tractor is generated, which is not restrictive. For example, in a case where a plurality of tractors perform cooperation work in the field, the travel routes R for the number of tractors may be generated, and expected work information about the travel routes R and the collision possibility C about the travel routes R may be displayed.

(2) The above-described exemplary embodiment has described an example in which the expected work distance ED and the expected work time ET are displayed as the route expectation information E, which is not restrictive. For example, other information may be displayed as the route expectation information E, such as a refueling point and time to running out of fuel.

(3) The above-described exemplary embodiment has described an example in which the recommended parameters and the previous parameters can be collectively assigned on the basis of a manual operation as the travel work parameters P, which is not restrictive. For example, after a condition of avoiding collision with part of the field is added on the basis of a manual operation as the travel work parameters P, avoidance parameters for generating the travel route R with the shortest distance may be able to be assigned collectively. In this case, an avoidance assignment unit for collectively assigning the avoidance parameters by an operation as the travel work parameters P, and an avoidance assignment button for operational input are provided.

(4) The above-described exemplary embodiment has described an example in which the recommended parameters and the previous parameters can be collectively assigned as the travel work parameters P, which is not restrictive. For example, in order to change the travel work parameters P, it is not necessary that the collective assignment function of parameters is provided.

(5) The above-described exemplary embodiment has described an example in which the collision possibility C is displayed in each straight line section of the external shape of the field, which is not restrictive. For example, the collision possibility C may be pinpointed as a point in the external shape of the field.

(6) The above-described exemplary embodiment has described an example in which the collision possibility C is displayed when the travel route R is generated, which is not restrictive. The collision possibility C does not need to be displayed when the travel route R is generated.

(7) The above-described exemplary embodiment has described an example in which the travel route generation device 6 is a vehicle-mounted device fixed to the driving unit 2 of the tractor, which is not restrictive. For example, the travel route generation device 6 may be portable that can be carried out of the tractor. In addition, as the travel route generation device 6, two devices may be provided including a vehicle-mounted device and a portable device, and these two devices may be used together. Alternatively, the travel route generation device 6 may be provided as a stationary control computer provided at a remote place distant from the tractor. In this case, the tractor is separately provided with a vehicle-mounted or portable display device, the stationary travel route generation device 6 transmits information to the display device by telecommunication, and the display device displays various pieces of information such as the travel route R and the route expectation information E.

(8) The above-described exemplary embodiment has described an example in which the travel route generation device 6 includes the display device 11 and the input device 10, which is not restrictive. For example, the travel route generation device 6, and the display device 11 and the input device 10 may be provided as different bodies and connected data-exchangeably.

(9) The above-described exemplary embodiment has described an example in which the travel route generation device 6 includes the memory 19 that stores the field data, which is not restrictive. For example, the field data may not be stored in the travel route generation device 6, and the acquisition unit 21 of the travel route generation device 6 may acquire the field data from another device that stores the field data.

(10) The above-described exemplary embodiment has described an example in which the tractor is temporarily stopped immediately before a position at which the collision possibility C is present in the travel route R, which is not restrictive. For example, the tractor may not be stopped even at a position where the collision possibility C is present in the travel route R. In this case, the operator determines whether to stop the tractor or not.

(11) The above-described exemplary embodiment has described an example in which, when the tractor travels along the travel route R, travel control of the tractor is performed by complete automatic travel by which rotation of the tractor is also performed automatically, which is not restrictive. For example, when the tractor travels along the travel route R, travel control of the tractor may be performed by semiautomatic travel by which straight movement of the tractor is performed automatically and rotation of the tractor is performed manually.

(12) The above-described exemplary embodiment has described an example in which the tractor includes the four-wheel travel device 1, which is not restrictive. For example, the four-wheel travel device 1 may be replaced with a crawler type travel device 1 or a semi crawler type travel device 1.

(13) The above-described exemplary embodiment has described an example of performing a touch operation on a screen as the input device 10, which is not restrictive. For example, instead of this, the input device 10 in which physical buttons are operated or the input device 10 in which operations of physical buttons and the touch operation on a screen are used together may be used.

INDUSTRIAL APPLICABILITY

The embodiment of the present invention can be used for the travel route generation device that generates the travel route for the work vehicle that travels in the field, such as agricultural vehicles including combines and rice transplanters, in addition to the above-described tractor.

A travel route generation device according to the embodiment of the present invention includes: an acquisition unit that acquires field data including a field shape; a setting unit that allows setting of a travel work parameter including headland information based on a manual operation; a generation unit that generates a travel route along which a work vehicle travels based on the field data and the travel work parameter; a route expectation unit that derives route expectation information about the generated travel route; and a display control unit that causes a display device capable of displaying information to display the acquired field shape, the generated travel route, and the derived route expectation information.

The embodiment of the present invention makes it possible to arbitrarily set a travel work parameter including headland information by an operator's manual operation. For example, the headland information includes information such as a headland work count and a headland width that can be set by a headland lap margin or the like. The operator can set appropriate headland information depending on details of the work. When the travel work parameter is set, the display device displays the travel route based on the travel work parameter and the route expectation information about the travel route, in addition to the field shape. The operator can quickly determine whether or not the generated travel route meets a request by referring to the route expectation information. When the travel work parameter is set again, the display device displays updated new travel route based on new travel work parameter and new route expectation information about the new travel route. This allows the operator to easily set the travel route that meets a request by adjusting the travel work parameter while referring to the route expectation information. Thus, the embodiment of the present invention allows easy setting of the travel route that meets the operator's request.

In the embodiment of the present invention, preferably, the route expectation unit derives an expected work distance about the travel route to be generated as the route expectation information, and the display control unit causes the display device to display the derived expected work distance.

With this configuration, since the display device displays the expected work distance about the generated travel route, for example, checking the expected work distance against residual fuel quantity and rough fuel efficiency makes it easy for the operator to make a work plan, such as making it easy to predict timing of refueling during work.

In the embodiment of the present invention, preferably, the setting unit allows setting of a travel vehicle speed as part of the travel work parameter, the route expectation unit derives expected work time about the travel route to be generated based on the travel vehicle speed as the route expectation information, and the display control unit causes the display device to display the derived expected work time.

With this configuration, setting the travel vehicle speed as part of the travel work parameter causes the display device to display the expected work time about the generated travel route. This makes it easy for the operator to make a work plan on the basis of the expected work time, for example, this makes it easy to predict whether or not work will be completed in one day, and when the rough work finish time will be.

In the embodiment of the present invention, preferably, a recommendation assignment unit is further provided capable of collectively assigning, based on a manual operation, a recommended parameter with which the travel route has a shortest distance, the recommended parameter being generated as the travel work parameter.

With this configuration, setting the recommended parameter as the travel work parameter allows setting of the travel route having the shortest distance. Since this recommended parameter can be collectively assigned based on a manual operation as the travel work parameter, time and effort of the operator can be reduced, for example, when compared with a case of searching by trial and error for a condition under which the travel route with the shortest distance is generated while resetting values individually for each item.

In the embodiment of the present invention, preferably, a previous assignment unit is further provided capable of collectively assigning, based on a manual operation, a previous parameter that is previously used as the travel work parameter.

With this configuration, setting the previous parameter as the travel work parameter allows reproduction of work similar to work performed previously. Since this previous parameter can be collectively assigned based on a manual operation as the travel work parameter, time and effort of the operator can be reduced, for example, when compared with a case of individually resetting values for each item to restore the previous parameter.

In the embodiment of the present invention, preferably, a collision determination unit is further provided that determines whether or not there is a collision possibility of colliding with part of the field when the work vehicle actually travels along the travel route, wherein when the collision determination unit determines that the collision possibility is present, the display control unit causes the display device to display the collision possibility determined by the collision determination unit.

With this configuration, in a stage of generating the travel route, the display device displays, when the work vehicle actually travels along the generated travel route, whether or not there is any collision possibility of colliding with a ridge or the like that is part of the field. For example, although there is a possibility from data that the work vehicle collides with a ridge during rotation of the work vehicle near the ridge, collision may not occur in the actual field. Therefore, display is made as a collision possibility. On the basis of the display of the collision possibility, the operator can evaluate validity of the generated travel route, and grasp in advance a position where caution is needed during work.

Obviously, numerous modifications and variations of the present invention are possible in light of the above teachings. It is therefore to be understood that within the scope of the appended claims, the invention may be practiced otherwise than as specifically described herein.

What is claimed is:

1. A travel route generation device comprising:
   a memory to store field data including shape information on a shape of a field in which a work vehicle is to work;
   an input interface via which a field operation parameter is input, the field operation parameter including headland information on a headland in the field; and
   circuitry configured to
      generate, based on the field data and the field operation parameter, an entirety of a travel route along which the work vehicle is to travel in the field,
      estimate a work status of the work vehicle in the field,
      display the shape of the field, the travel route, and the work status in a display, and
      output a control signal to a controller of the work vehicle based on the travel route such that the controller performs drive and steering control of the work vehicle based on the control signal,
   wherein the entirety of the travel route comprises:
      a central portion route along which the work vehicle travels in a central portion of the field, the central portion route including U-turn routes and straight line sections connecting the U-turn routes; and
      a head land route along which the work vehicle travels in the headland and which surrounds the central portion route.

2. The travel route generation device according to claim 1, wherein the work status includes a total travel distance by which the work vehicle is to travel along a whole of the travel route.

3. The travel route generation device according to claim 1,
   wherein a travel vehicle speed is input via the input interface as the field operation parameter, and
   wherein the work status includes a total work time for which the work vehicle is to travel along a whole of the travel route based on the travel vehicle speed.

4. The travel route generation device according to claim 1, wherein a recommended parameter with which the travel route has a shortest length is collectively assigned to the field operation parameter.

5. The travel route generation device according to claim 1,
   wherein the memory is to store a previous field operation parameter that is previously used as the field operation parameter, and
   wherein the circuitry is configured to generate the travel route based on the previous field operation parameter collectively assigned to the field operation parameter via a manual operation.

6. The travel route generation device according to claim 1,
   wherein the circuitry is configured to determine whether or not there is a collision possibility of colliding with part of a ridge of the field when the work vehicle actually travels along the travel route, and
   wherein when the circuitry determines that there is the collision possibility, the circuitry is configured to display the collision possibility determined.

7. The travel route generation device according to claim 1, wherein the circuitry is configured to acquire the field data to be stored in the memory.

8. A travel route generation device comprising:
   a memory to store field data including shape information on a shape of a field in which a work vehicle is to work;
   an input interface via which a field operation parameter is input, the field operation parameter including headland information on a headland in the field;
   travel route generation means for generating, based on the field data and the field operation parameter, an entirety of a travel route along which the work vehicle is to travel in the field;
   work status estimation means for estimating a work status of the work vehicle in the field;
   display means for displaying the shape of the field, the travel route, and the work status in a display; and
   output means to output a control signal to a controller of the work vehicle based on the travel route such that the controller performs drive and steering control of the work vehicle based on the control signal,
   wherein the entirety of the travel route comprises:
      a central portion route along which the work vehicle travels in a central portion of the field, the central portion route including U-turn routes and straight line sections connecting the U-turn routes; and
      a head land route along which the work vehicle travels in the headland and which surrounds the central portion route.

9. A travel route generation method comprising:
   providing field data in a memory, the field data including shape information on a shape of a field in which a work vehicle is to work;
   inputting a field operation parameter including headland information on a headland in the field;
   generating, based on the field data and the field operation parameter, an entirety of a travel route along which the work vehicle is to travel in the field;
   estimating a work status of the work vehicle in the field;
   displaying the shape of the field, the travel route, and the work status in a display; and
   outputting a control signal to a controller of the work vehicle based on the travel route such that the controller performs drive and steering control of the work vehicle based on the control signal, wherein the entirety of the travel route comprises:
a central portion route along which the work vehicle travels in a central portion of the field, the central portion route including U-turn routes and straight line sections connecting the U-turn routes; and
a head land route along which the work vehicle travels in the headland and which surrounds the central portion route.

* * * * *